(12) United States Patent
Wang et al.

(10) Patent No.: US 9,907,021 B2
(45) Date of Patent: Feb. 27, 2018

(54) METHOD AND APPARATUS FOR REDUCING POWER CONSUMPTION

(71) Applicant: Huawei Device (Dongguan) Co., Ltd., Dongguan (CN)

(72) Inventors: Tongbo Wang, Shanghai (CN); Zhihua Pang, Shenzhen (CN); Yingming Tang, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 59 days.

(21) Appl. No.: 15/111,458

(22) PCT Filed: Dec. 31, 2014

(86) PCT No.: PCT/CN2014/095754
§ 371 (c)(1),
(2) Date: Jul. 13, 2016

(87) PCT Pub. No.: WO2015/103936
PCT Pub. Date: Jul. 16, 2015

(65) Prior Publication Data
US 2016/0337976 A1    Nov. 17, 2016

(30) Foreign Application Priority Data
Jan. 13, 2014 (CN) .......................... 2014 1 0013503

(51) Int. Cl.
*H04W 52/24* (2009.01)
*H04W 52/02* (2009.01)
*H04W 72/04* (2009.01)

(52) U.S. Cl.
CPC ... *H04W 52/0245* (2013.01); *H04W 52/0251* (2013.01); *H04W 72/0473* (2013.01); *Y02B 60/50* (2013.01)

(58) Field of Classification Search
None
See application file for complete search history.

(56) References Cited

U.S. PATENT DOCUMENTS

| 8,238,868 B2 * | 8/2012 | Duan ................. G01R 33/0029 323/267 |
| 2005/0143115 A1 | 6/2005 | Hiddink et al. |

(Continued)

FOREIGN PATENT DOCUMENTS

| CN | 101977097 A | 2/2011 |
| CN | 103119992 A | 5/2013 |

(Continued)

*Primary Examiner* — Chirag Shah
*Assistant Examiner* — Amar Persaud
(74) *Attorney, Agent, or Firm* — Slater Matsil, LLP

(57) ABSTRACT

A method includes identifying, by a wireless communications module included in a communications device and when a Wireless Fidelity (Wi-Fi) mode of the communications device is already enabled, whether service data to be sent exists currently. The method further includes acquiring, by the wireless communications module, received attribute information in response to the service data existing currently. The method further includes determining, by the wireless communications module by using the received attribute information, a sending rate for sending the service data; and determining, by the wireless communications module according to the sending rate, a supply voltage value of a power amplifier connected to the wireless communications module, so that the power amplifier amplifies, according to the supply voltage value, a service request signal carrying the service data.

20 Claims, 2 Drawing Sheets

(56) References Cited

U.S. PATENT DOCUMENTS

| | | | |
|---|---|---|---|
| 2008/0182530 A1* | 7/2008 | Mueller | H03G 3/3042 455/115.1 |
| 2009/0052426 A1* | 2/2009 | Perraud | H04W 52/146 370/338 |
| 2010/0291975 A1* | 11/2010 | Dimpflmaier | H03F 1/0211 455/572 |
| 2011/0121939 A1 | 5/2011 | Hosomi | |
| 2012/0071106 A1 | 3/2012 | Kadous et al. | |
| 2012/0088510 A1 | 4/2012 | Akhi et al. | |
| 2012/0264378 A1* | 10/2012 | Steele | H03G 3/3042 455/73 |
| 2012/0329515 A1* | 12/2012 | Husted | H04W 52/226 455/552.1 |
| 2013/0039212 A1* | 2/2013 | Li | H04W 52/0245 370/253 |
| 2013/0343268 A1 | 12/2013 | Wan et al. | |
| 2014/0157020 A1 | 6/2014 | Hosomi | |

FOREIGN PATENT DOCUMENTS

| | | |
|---|---|---|
| CN | 103249120 A | 8/2013 |
| CN | 103415066 A | 11/2013 |
| JP | H04269018 A | 9/1992 |
| JP | 2009529842 A | 8/2009 |
| JP | 2010011062 A | 1/2010 |
| JP | 2012094935 A | 5/2012 |
| KR | 20130079551 A | 7/2013 |
| WO | 2007104341 A1 | 9/2007 |
| WO | 2010016418 A1 | 2/2010 |
| WO | 2015021784 A1 | 2/2015 |

\* cited by examiner

METHOD AND APPARATUS FOR REDUCING POWER CONSUMPTION

CROSS-REFERENCE TO RELATED APPLICATIONS

This patent application is a national phase filing under section 371 of PCT/CN2014/095754, filed on Dec. 31, 2014, which claims priority to Chinese Patent Application No. 201410013503.2, filed with the Chinese Patent Office on Jan. 13, 2014, and entitled "METHOD AND APPARATUS FOR REDUCING POWER CONSUMPTION", which applications are incorporated herein by reference in their entirety.

TECHNICAL FIELD

The present disclosure relates to the field of communications technologies, and in particular embodiments, to a method and an apparatus for reducing power consumption.

BACKGROUND

With rapid popularization of communications networks, a Wireless Fidelity (Wi-Fi for short) technology is increasingly popular among people, and becomes a function that is essentially configured in a communications device.

Even though the Wi-Fi technology brings much convenience to users, because the Wi-Fi technology does not have a power control technology similar to that of a 2G/3G network, there is a large power consumption problem, which affects use of intelligent terminals. In an existing communications device, a Wi-Fi function needs to be implemented by using the following components, as shown in FIG. 1: a Wi-Fi chip, a power amplifier (PA for short), a filter, and an antenna. The Wi-Fi chip sets the PA to be enabled (a signal PA_EN is enabled), and sends, to the PA, a service request signal carrying data to be sent. The PA amplifies the service request signal within an enabled period, and sends the service request signal to the filter. After performing filtering processing on the amplified service request signal, the filter sends the service request signal to an external communications device by using the antenna.

To meet a requirement of sending a high rate (for example, a modulation scheme is 256QAM or 64QAM) signal imposed on linearity property, in the prior art, the Wi-Fi chip sets a static bias point of the PA relatively high; otherwise, a sent signal is intercepted and distorted. In addition, the Wi-Fi chip sets same static bias points for the PA according to different sending rates, so that the static bias points are managed together.

However, a solution for implementing the Wi-Fi function in the prior art also has the following disadvantages. The Wi-Fi chip sets uniform static bias points for the PA according to different sending rates; therefore, when a sending rate is high, power consumption of the PA is relatively high, and when the sending rate is low, the power consumption of the PA is also in a relatively high state, resulting in that the power consumption of the PA is always in a relatively high state and cannot be reduced. In addition, because the power consumption of the PA is always in a relatively high state, a battery in the communications device needs to continuously supply power to the Wi-Fi chip and the PA, consuming excessively much electricity of the battery.

SUMMARY

Embodiments of the present invention provide a method and an apparatus for reducing power consumption, which implement that a Wi-Fi chip sets different static bias points according to different sending rates, and therefore power consumption of a PA is reduced, and electricity consumption of a battery in a communications device is also reduced, thereby achieving an objective of power saving.

According to a first aspect, an embodiment of the present invention provides a method for reducing power consumption, where the method includes:

identifying, by a wireless communications module included in a communications device, when a Wireless Fidelity (Wi-Fi) mode of the communications device is already enabled, whether service data to be sent exists currently;

acquiring, by the wireless communications module, received attribute information of the wireless communications module if the service data exists currently;

determining, by the wireless communications module by using the received attribute information, a sending rate for sending the service data; and determining, by the wireless communications module according to the sending rate, a supply voltage value of a power amplifier connected to the wireless communications module, so that the power amplifier amplifies, according to the supply voltage value, a service request signal carrying the service data.

In an implementation of the first aspect, the received attribute information acquired by the wireless communications module includes: received signal strength indicator RSSI information and packet error rate PER information; and the determining, by the wireless communications module by using the received attribute information, a sending rate for sending the service data includes: finding, by the wireless communications module from a stored sending rate table by using the signal strength indicator RSSI information and the packet error rate PER information, a sending rate for sending the service data, where the sending rate matches the signal strength indicator RSSI information and the packet error rate PER information.

In an implementation of the first aspect, the determining, by the wireless communications module according to the sending rate, a supply voltage value of a power amplifier connected to the wireless communications module includes:

acquiring, by the wireless communications module according to the sending rate, a modulation and coding scheme MCS index number that corresponds to the sending rate;

acquiring, by the wireless communications module according to the modulation and coding scheme MAC index number, a rate grouping class to which the modulation and coding scheme MAC index number belongs; and determining, by the wireless communications module, a supply voltage value, which matches the rate grouping class, of the power amplifier by using the rate grouping class.

In an implementation of the first aspect, after the determining, by the wireless communications module, a supply voltage value, which matches the rate grouping class, of the power amplifier, the method further includes: sending, by the wireless communications module, a first control signal to a direct current-direct current converter connected to the wireless communications module, where the first control signal includes first power supply information, so that the direct current-direct current converter provides a matched supply voltage value for the power amplifier according to the first power supply information.

In an implementation of the first aspect, after the identifying, by a wireless communications module included in a communications device, when a Wireless Fidelity (Wi-Fi)

mode of the communications device is already enabled, whether service data to be sent exists currently, the method further includes, if the service data does not exist currently, determining, by the wireless communications module, that the supply voltage value of the power amplifier is 0 V.

In an implementation of the first aspect, after the determining, by the wireless communications module according to the sending rate, a supply voltage value of a power amplifier connected to the wireless communications module, the method further includes:

determining, by the wireless communications module, whether the service data is already sent completely; and if the service data is already sent completely, determining, by the wireless communications module, that the supply voltage value of the power amplifier is 0 V; or if the service data is not sent completely, acquiring, by the wireless communications module, the received attribute information.

In an implementation of the first aspect, after the wireless communications module sets the supply voltage value of the power amplifier to 0 V, the method further includes sending, by the wireless communications module, a second control signal to a direct current-direct current converter connected to the wireless communications module, where the second control signal includes second power supply information, so that the direct current-direct current converter stops, according to the second power supply information, providing a matched supply voltage value for the power amplifier.

According to a second aspect, an embodiment of the present invention provides an apparatus for reducing power consumption, where the apparatus includes:

an identification unit, configured to identify, when a Wireless Fidelity Wi-Fi mode of a communications device is already enabled, whether service data to be sent exists currently;

an acquiring unit, configured to acquire received attribute information of the apparatus if the service data exists currently; and a determining unit, configured to determine, by using the received attribute information, a sending rate for sending the service data, where the determining unit is further configured to determine, according to the sending rate, a supply voltage value of a power amplifier connected to the wireless communications module, so that the power amplifier amplifies, according to the supply voltage value, a service request signal carrying the service data.

In an implementation of the second aspect, the received attribute information acquired by the acquiring unit includes: received signal strength indicator RSSI information and packet error rate PER information; and the determining unit is configured to find, from a stored sending rate table by using the signal strength indicator RSSI information and the packet error rate PER information, a sending rate for sending the service data, where the sending rate matches the signal strength indicator RSSI information and the packet error rate PER information.

In an implementation of the second aspect, the determining unit is configured to:

acquire, according to the sending rate, a modulation and coding scheme MCS index number that corresponds to the sending rate;

acquire, according to the modulation and coding scheme MAC index number, a rate grouping class to which the modulation and coding scheme MAC index number belongs; and determine a supply voltage value, which matches the rate grouping class, of the power amplifier by using the rate grouping class.

In an implementation of the second aspect, the apparatus further includes a sending unit, configured to send a first control signal to a direct current-direct current converter connected to the wireless communications module, where the first control signal includes first power supply information, so that the direct current-direct current converter provides a matched supply voltage value for the power amplifier according to the first power supply information.

In an implementation of the second aspect, the determining unit is further configured to, if the service data does not exist currently, determine that the supply voltage value of the power amplifier is 0 V.

In an implementation of the second aspect, the apparatus further includes:

a judging unit, configured to determine whether the service data is already sent completely, where the determining unit is further configured to: if the service data is already sent completely, determine that the supply voltage value of the power amplifier is 0 V; and the acquiring unit is further configured to: if the service data is not sent completely, acquire the received attribute information.

In an implementation of the second aspect, the sending unit is further configured to send a second control signal to a direct current-direct current converter connected to the wireless communications module, where the second control signal includes second power supply information, so that the direct current-direct current converter stops, according to the second power supply information, providing a matched supply voltage value for the power amplifier.

Therefore, according to the method and apparatus for reducing power consumption that are provided in the embodiments of the present invention, the wireless communications module determines, according to acquired received attribute information, a sending rate for sending service data to be sent, and determines, according to the sending rate, a supply voltage value of a power amplifier connected to the wireless communications module, so that the power amplifier amplifies, according to the determined supply voltage value, a service request signal carrying the service data; and the wireless communications module determines supply voltage values of the power amplifier according to different sending rates, and then determines static working points at different locations for the power amplifier according to the different supply voltage values, so that the power amplifier adjusts power consumption according to the different sending rates within an enabled period, and therefore the power consumption of the power amplifier is reduced, and electricity consumption of a battery in a communications device is also reduced, thereby achieving an objective of power saving.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present disclosure.

For ease of real-time understanding of the present disclosure, further explanations and descriptions are provided below with reference to the accompanying drawings by using specific embodiments, and the embodiments do not constitute any limitation to the embodiments of the present invention.

Embodiment 1

Figure 1:
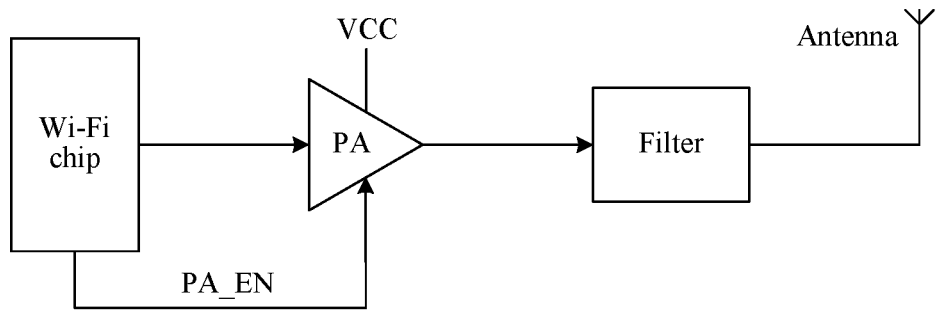
FIG. 1 is a block diagram of a circuit of hardware for implementing a Wi-Fi function in the prior art.
Figure 2:
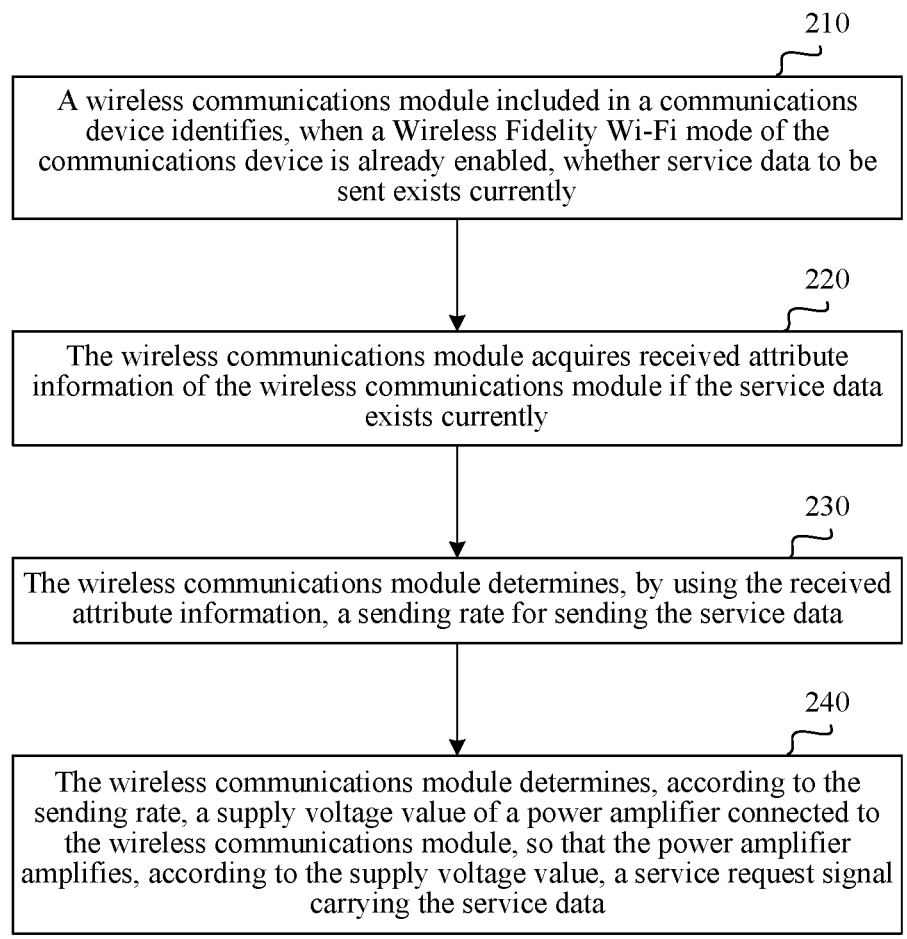
FIG. 2 is a flowchart of a method for reducing power consumption according to Embodiment 1 of the present invention.

A method for reducing power consumption provided in Embodiment 1 of the present invention is described below in detail by using FIG. 2 as an example. FIG. 2 is a flowchart of the method for reducing power consumption according to Embodiment 1 of the present invention. In this embodiment of the present invention, the following steps are executed by a wireless communications module, the wireless communications module can be included in a communications device, and the communications device can be a device, such as a mobile terminal or a router, needing to send service data. As shown in FIG. 2, this embodiment includes the following steps.

Step 210: A wireless communications module included in a communications device identifies, when a Wireless Fidelity Wi-Fi mode of the communications device is already enabled, whether service data to be sent exists currently.

Specifically, when a Wireless Fidelity (Wi-Fi) mode of the communications device is already enabled, the wireless communications module included in the communications device identifies whether the service data to be sent exists currently in the wireless communications module.

The service data to be sent includes data entered by a user or data generated by a processor in the communications device.

Further, before step 210 is performed, the communications device receives an operation instruction entered by the user, and the communications device starts a Wi-Fi mode according to the operation instruction, so as to enter a Wi-Fi mode. When the communications device enters the Wi-Fi mode, the wireless communications module triggers the wireless communications module to start to identify whether the service data to be sent exists currently.

In an example, a user wants to perform a wireless network connection by using the communications device, the user first enters an operation instruction, the communications device starts a Wi-Fi mode according to the operation instruction, and the wireless communications module identifies whether the service data to be sent exists currently.

In this embodiment of the present invention, the wireless communications module is a Wi-Fi chip.

Step 220: The wireless communications module acquires received attribute information of the wireless communications module if the service data exists currently.

Specifically, according to the identification in step 210, the wireless communications module acquires the received attribute information of the wireless communications module if the service data to be sent exists currently.

Further, the acquiring, by the wireless communications module, received attribute information of the wireless communications module if the service data exists currently includes the following. If the service data to be sent exists currently, detecting, by the wireless communications module, a related attribute of a received signal received by an antenna, where the signal received by the antenna in the communications device refers to a signal sent by another Wi-Fi device performing data communication with the communications device. According to the attribute of the received signal, the wireless communications module may determine a sending rate for sending the service data, where as an example rather than a limitation, the received attribute information includes: received signal strength indicator (RSSI for short) information and packet error rate (PER for short) information.

According to the example in step 210, the user enters again a user name and a password that are used for a wireless network connection, and if the wireless communications module identifies that the service data to be sent exists currently, the wireless communications module acquires the RSSI information and the PER information.

Step 230: The wireless communications module determines, by using the received attribute information, a sending rate for sending the service data.

Specifically, the wireless communications module determines, according to the received attribute information acquired in step 220, the sending rate for sending the service data to be sent.

Further, the determining, by the wireless communications module by using the received attribute information, a sending rate for sending the service data includes finding, from a stored sending rate table by the wireless communications module by using the RSSI information and the PER information, a sending rate for sending the service data, where the sending rate matches the signal strength indicator RSSI information and the packet error rate PER information.

Sending rate tables are determined by manufacturers themselves before the wireless communications module is delivered, and the sending rate tables determined by manufacturers are different.

It should be noted that, the sending rate refers to a physical layer sending rate (PHY_RATE) used when the wireless communications module sends service data.

In this embodiment of the present invention, the sending rate table is stored in a storage unit of the wireless communications module, and is stored by a manufacturer before the wireless communications module is delivered. The sending rate table includes different sending rates corresponding to multiple pieces of RSSI information and PER information.

Step 240: The wireless communications module determines, according to the sending rate, a supply voltage value of a power amplifier connected to the wireless communications module, so that the power amplifier amplifies, according to the supply voltage value, a service request signal carrying the service data.

Specifically, the wireless communications module determines, according to the sending rate determined in step 230, the supply voltage value of the power amplifier connected to the wireless communications module, so that the power amplifier amplifies, according to the supply voltage value, the service request signal carrying the service data. In this embodiment of the present invention, the wireless communications module determines supply voltage values of the power amplifier according to different sending rates, and determines static working points at different locations for the power amplifier according to the different supply voltage values, so that the power amplifier adjusts power consumption according to the different sending rates within an enabled period, and therefore the power consumption of the power amplifier is reduced, and electricity consumption of a battery in the communications device is also reduced, thereby achieving an objective of power saving.

Further, the determining, by the wireless communications module according to the sending rate, a supply voltage value of a power amplifier connected to the wireless communications module includes acquiring, by the wireless communications module according to the sending rate, a modulation and coding scheme MCS index number that corresponds to the sending rate, where as shown in Table 1, Table 1 is a correspondence table between MCSs and sending rates.

TABLE 1

Correspondence table between MCSs and sending rates

| Modulation and coding scheme MCS | Modulation | Sending rate (Mb/s) 800 ns GI | Sending rate (Mb/s) 400 ns GI |
|---|---|---|---|
| 0 | BPSK | X1 | Y1 |
| 1 | QPSK | X2 | Y2 |
| 2 | QPSK | X3 | Y3 |
| 3 | 16-QAM | X4 | Y4 |
| 4 | 16-QAM | X5 | Y5 |
| 5 | 64-QAM | X6 | Y6 |
| 6 | 64-QAM | X7 | Y7 |
| 7 | 64-QAM | X8 | Y8 |
| 8 | 256-QAM | X9 | Y9 |
| 9 | 256-QAM | X10 | Y10 |

In Table 1, each modulation and coding scheme (MCS for short) index number corresponds to sending rates that correspond to a group of RSSI information and PER information, that is, multiple sending rates correspond to one MCS index number.

In Table 1, GI is a guard interval. In order to ensure reliability of data transmission, when sending service data, the wireless communications module sets a guard interval between neighboring service data that is sent, that is, GI, which is used to ensure that a receiver can correctly parse out both pieces of service data; ns is a nanosecond.

In Table 1, the BPSK is binary phase shift keying, and is a manner for expressing information phase shift keying by using plural wave combinations that deviate from phases. The BPSK uses a reference sine wave and a wave with a reverse phase, making one party be 0 and the other party be 1, so that 1-bit information can be sent and received simultaneously.

The QPSK is quadrature phase shift keying and indicates numerical information by using differences of four different phases of a carrier. In the QPSK, 2-bit information can be transmitted during each modulation, and the information is transferred by using the four phases of the carrier.

The QAM is quadrature amplitude modulation and is performing suppressed carrier double sideband amplitude modulation on intra-frequency carriers that are orthogonal to each other by using two channels of independent baseband signals, and is implementing transmission of two pieces of parallel numerical information by using orthogonality of frequency spectra of this types of modulated signals in same bandwidth. The 16-QAM refers to a QAM modulation scheme including 16 types of symbols; the 64-QAM refers to a QAM modulation scheme including 64 types of symbols; the 256QAM refers to a QAM modulation scheme including 256 types of symbols.

After acquiring the MCS index number that corresponds to the sending rate, the wireless communications module acquires, according to the MCS index number, a rate grouping class n to which the MCS index number belongs. As shown in Table 2, Table 2 is a rate grouping class table.

TABLE 2

Rate grouping class table

| Class n | Modulation and coding scheme MCS | Modulation | Coding rate | Error vector magnitude |
|---|---|---|---|---|
| 1 | 0 | BPSK | 1/2 | −5 |
| 2 | 1 | QPSK | 1/2 | −10 |
|   | 2 | QPSK | 3/4 | −13 |
| 3 | 3 | 16-QAM | 1/2 | −16 |
|   | 4 | 16-QAM | 3/4 | −19 |
| 4 | 5 | 64-QAM | 2/3 | −22 |
|   | 6 | 64-QAM | 3/4 | −25 |
|   | 7 | 64-QAM | 5/6 | −28 |
| 5 | 8 | 256-QAM | 3/4 | −30 |
|   | 9 | 256-QAM | 5/6 | −32 |

After acquiring the rate grouping class n to which the MCS index number belongs, the wireless communications module determines the supply voltage value VCC, which matches the rate grouping class, of the power amplifier by using the rate grouping class n, so that the power amplifier amplifies, according to the supply voltage value, the service request signal carrying the service data. As shown in Table 3, Table 3 is a supply voltage table.

TABLE 3

Supply voltage table

| Class n | Supply voltage VCC |
|---|---|
| 1 | V1 |
| 2 | V2 |
| 3 | V3 |
| 4 | V4 |
| 5 | V5 |

In Table 3, a voltage value Vi included in the supply voltage VCC is a supply voltage value of the power amplifier.

In an example, the wireless communications module determines in step 230 that a MCS index number corresponding to the sending rate for sending the service data to be sent is number 0. A rate grouping class n to which the index number MCS0 is equal to 1, that is, a first class; then, the wireless communications module determines, according to the supply voltage V1 corresponding to the first class, that the supply voltage value of the power amplifier is V1, so that in a case in which the supply voltage value is V1, the power amplifier amplifies the service request signal carrying the service data.

Optionally, after step 240 in this embodiment of the present invention, the method further includes a step of sending, by the wireless communications module, a first control signal to a direct current-direct current converter. After this step, the direct current-direct current converter supplies power to the power amplifier according to first power supply information included in the first control signal. Specific steps are as follows: sending, by the wireless communications module, the first control signal to the direct current-direct current converter connected to the wireless communications module, where the first control signal includes the first power supply information, so that the direct current-direct current converter provides a matched supply voltage value for the power amplifier according to the first power supply information.

Specifically, after the wireless communications module determines the supply voltage value of the power amplifier, the wireless communications module generates the first control signal, where the first control signal includes the first power supply information, that is, the supply voltage value of the power amplifier; the wireless communications module sends the first control signal to the direct current-direct current converter connected to the wireless communications module, so that the direct current-direct current converter provides the matched supply voltage value for the power amplifier according to the first power supply information.

Optionally, the identification step of step 210 in this embodiment of the present invention further includes another implementation case, that is, if service data to be sent does not exist currently, the wireless communications module determines that the supply voltage value of the power amplifier is 0 V.

The wireless communications module sends a second control signal to a direct current-direct current converter connected to the wireless communications module, where the second control signal includes second power supply information, so that the direct current-direct current converter stops, according to the second power supply information, providing a matched supply voltage value for the power amplifier.

Specifically, after the wireless communications module determines that the supply voltage value of the power amplifier is 0 V, the wireless communications module generates the second control signal, where the second control signal includes the second power supply information, that is, the supply voltage value of the power amplifier is 0 V; the wireless communications module sends the second control signal to the direct current-direct current converter connected to the wireless communications module, so that the direct current-direct current converter stops, according to the second power supply information, providing the matched supply voltage value for the power amplifier, and therefore power consumption of the power amplifier is reduced, thereby achieving an objective of power saving.

Optionally, after step 240 in this embodiment of the present invention, the method further includes a step of determining, by the wireless communications module, whether the service data to be sent is sent completely; the supply voltage value of the power amplifier is determined according to an actual sending status, which reduces power consumption of the power amplifier, thereby achieving the objective of power saving. Specific steps are determining, by the wireless communications module, whether the service data is already sent completely. If the service data is already sent completely, determining, by the wireless communications module, that the supply voltage value of the power amplifier is 0 V; or if the service data is not sent completely, acquiring, by the wireless communications module, the received attribute information.

Specifically, after determining the supply voltage value of the power amplifier, the wireless communications module determines whether the service data to be sent is sent completely.

If the service data to be sent is sent completely, the wireless communications module determines that the supply voltage value of the power amplifier is 0 V, generates the second control signal, where the second control signal includes the second power supply information, and sends the second control signal to the direct current-direct current converter, so that the direct current-direct current converter stops, according to the second power supply information, providing the matched supply voltage value for the power amplifier, and therefore the power consumption of the power amplifier is reduced, thereby achieving the objective of power saving.

If the service data to be sent is not sent completely, the wireless communications module acquires the received attribute information again, and step 220 to step 240 are performed repeatedly; the wireless communications module determines again, according to the currently acquired RSSI information and PER information, the sending rate for sending the service data, and adjusts the supply voltage value of the power amplifier, and therefore the power consumption of the power amplifier is reduced, thereby achieving an objective of power saving.

Therefore, according to the method for reducing power consumption provided in this embodiment of the present invention, the wireless communications module determines, according to acquired received attribute information, a sending rate for sending service data to be sent, and determines, according to the sending rate, a supply voltage value of a power amplifier connected to the wireless communications module, so that the power amplifier amplifies, according to the determined supply voltage value, a service request signal carrying the service data; and the wireless communications module determines supply voltage values of the power amplifier according to different sending rates, and then determines static working points at different locations for the power amplifier according to the different supply voltage values, so that the power amplifier adjusts power consumption according to the different sending rates within an enabled period, and therefore the power consumption of the power amplifier is reduced, and electricity consumption of a battery in a communications device is also reduced, thereby achieving an objective of power saving.

Figure 3:
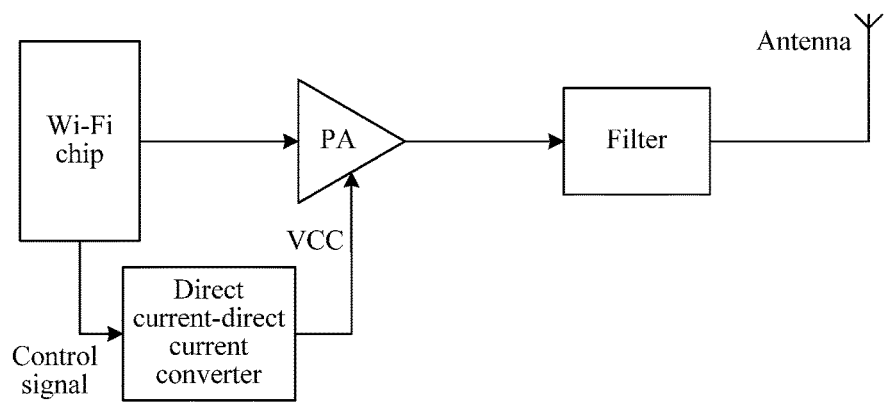
FIG. 3 is a block diagram of a circuit of hardware according to an embodiment of the present invention.

For ease of real-time understanding of the present disclosure, the method for reducing power consumption in Embodiment 1 is described below in detail with reference to FIG. 3. FIG. 3 is a block diagram of a circuit of hardware according to an embodiment of the present invention.

In FIG. 3, a wireless communications module is implemented by using a Wi-Fi chip, the Wi-Fi chip is separately connected to a power amplifier and a direct current-direct current converter, the direct current-direct current converter is connected to the power amplifier, and provides a supply voltage for the power amplifier, the power amplifier is connected to a filter, and the filter is connected to an antenna.

The Wi-Fi chip, the power amplifier, the direct current-direct current converter, the filter, and the antenna are all in a communications device. A working process is as follows: when a Wi-Fi mode of the communications device is already enabled, the Wi-Fi chip identifies whether service data to be sent exists in the Wi-Fi chip currently; and if the service data to be sent exists currently, the Wi-Fi chip acquires received attribute information.

The Wi-Fi chip sends a detection signal to the antenna by using the power amplifier and the filter, and receives a reflected signal fed back by the antenna; the Wi-Fi chip acquires the received attribute information according to the reflected signal, where the received attribute information includes RSSI information and PER information.

The Wi-Fi chip determines a sending rate for sending the service data. The Wi-Fi chip finds, from a stored sending rate table by using the RSSI information and the PER information, a sending rate for sending the service data, where the sending rate matches the RSSI information and the PER information (that the Wi-Fi chip determines, according to the RSSI information and the PER information, the sending rate for sending the service data is already described in detail in Embodiment 1, and is not described herein again).

The Wi-Fi chip determines a supply voltage value of the power amplifier according to the determined sending rate (that the Wi-Fi chip determines the supply voltage value of the power amplifier according to the sending rate is already described in detail in Embodiment 1, and is not described herein again), and sends a first control signal to the direct current-direct current converter; and the direct current-direct current converter provides a matched supply voltage value for the power amplifier according to first power supply information included in the first control signal, so that the power amplifier amplifies, according to the supply voltage value, a service request signal carrying the service data.

In this embodiment of the present invention, because the Wi-Fi chip determines supply voltage values of the power amplifier according to different sending rates, and determines static working points at different locations for the power amplifier according to the different supply voltage values, the power amplifier adjusts power consumption according to the different sending rates within an enabled period, and therefore the power consumption of the power amplifier is reduced, and electricity consumption of a battery in a communications device is also reduced, thereby achieving an objective of power saving.

Embodiment 2

Figure 4:
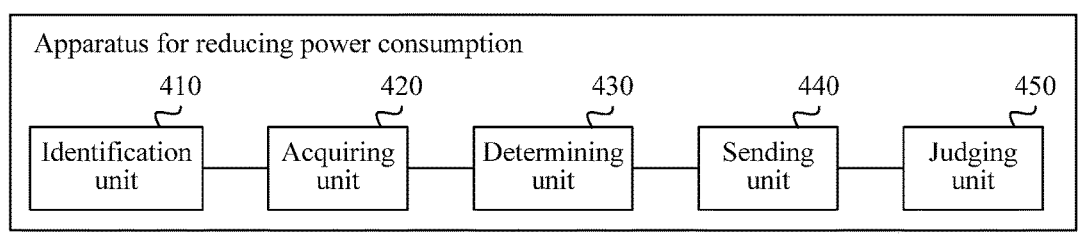
FIG. 4 is a schematic structural diagram of an apparatus for reducing power consumption according to Embodiment 2 of the present invention.

Correspondingly, Embodiment 2 of the present invention further provides an apparatus for reducing power consumption, and the apparatus is configured to implement the method for reducing power consumption in Embodiment 1. As shown in FIG. 4, the apparatus includes: an identification unit 410, an acquiring unit 420, and a determining unit 430, where the identification unit 410 in the apparatus is configured to identify, when a Wireless Fidelity Wi-Fi mode of a communications device is already enabled, whether service data to be sent exists currently. The acquiring unit 420 is configured to acquire received attribute information of the apparatus if the service data exists currently; and the determining unit 430 is configured to determine, by using the received attribute information, a sending rate for sending the service data, where the determining unit 430 is further configured to determine, according to the sending rate, a supply voltage value of a power amplifier connected to a wireless communications module, so that the power amplifier amplifies, according to the supply voltage value, a service request signal carrying the service data.

The received attribute information acquired by the acquiring unit 420 includes: received signal strength indicator RSSI information and packet error rate PER information. The determining unit 430 is configured to find, from a stored sending rate table by using the signal strength indicator RSSI information and the packet error rate PER information, a sending rate for sending the service data, where the sending rate matches the signal strength indicator RSSI information and the packet error rate PER information.

The determining unit 430 is configured to acquire, according to the sending rate, a modulation and coding scheme MCS index number that corresponds to the sending rate. The determining unit 430 is also configured to acquire, according to the modulation and coding scheme MAC index number, a rate grouping class to which the modulation and coding scheme MAC index number belongs; and determine a supply voltage value, which matches the rate grouping class, of the power amplifier by using the rate grouping class.

The apparatus further includes: a sending unit 440, configured to send a first control signal to a direct current-direct current converter connected to the wireless communications module, where the first control signal includes first power supply information, so that the direct current-direct current converter provides a matched supply voltage value for the power amplifier according to the first power supply information.

The determining unit 430 is further configured to: if the service data does not exist currently, determine that the supply voltage value of the power amplifier is 0 V.

The apparatus further includes: a judging unit 450, configured to determine whether the service data is already sent completely. The determining unit 430 is further configured to, if the service data is already sent completely, determine that the supply voltage value of the power amplifier is 0 V; and the acquiring unit 420 is further configured to, if the service data is not sent completely, acquire the received attribute information.

The sending unit 440 is further configured to send a second control signal to a direct current-direct current converter connected to the wireless communications module, where the second control signal includes second power supply information, so that the direct current-direct current converter stops, according to the second power supply information, providing a matched supply voltage value for the power amplifier.

Therefore, according to the apparatus for reducing power consumption provided in this embodiment of the present invention, the apparatus for reducing power consumption determines, according to acquired received attribute information, a sending rate for sending service data to be sent, and determines, according to the sending rate, a supply voltage value of a power amplifier connected to the apparatus for reducing power consumption, so that the power amplifier amplifies, according to the determined supply voltage value, a service request signal carrying the service data; and the apparatus for reducing power consumption determines supply voltage values of the power amplifier according to different sending rates, and then determines static working points at different locations for the power amplifier according to the different supply voltage values, so that the power amplifier adjusts power consumption according to the different sending rates within an enabled period, and therefore the power consumption of the power amplifier is reduced, and electricity consumption of a battery in a communications device is also reduced, thereby achieving an objective of power saving.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A method, comprising:
   identifying, by a wireless communications module comprised in a communications device and when a Wireless Fidelity (Wi-Fi) mode of the communications device is already enabled, whether service data to be sent exists currently;
   acquiring, by the wireless communications module, received attribute information of the wireless communications module in response to the service data existing currently;
   determining, by the wireless communications module by using the received attribute information, a sending rate for sending the service data;
   acquiring, by the wireless communications module, according to the sending rate, a modulation and coding scheme (MCS) index number that corresponds to the sending rate;
   acquiring, by the wireless communications module, according to the MCS index number, a rate grouping class to which the MCS index number belongs; and
   determining, by the wireless communications module, according to the rate grouping class, a supply voltage value for a direct current-direct current converter to provide to a power amplifier, wherein the wireless communications module is connected to the direct current-direct current converter and to the power amplifier, wherein the supply voltage value matches the rate grouping class, so that the power amplifier amplifies, according to the supply voltage value, a service request signal carrying the service data.

2. The method according to claim 1, wherein the received attribute information acquired by the wireless communications module comprises received signal strength indicator (RSSI) information and packet error rate (PER) information, and wherein the determining, by the wireless communications module by using the received attribute information, a sending rate for sending the service data comprises:
   finding, by the wireless communications module from a stored sending rate table by using the RSSI information and the PER information, a sending rate for sending the service data, wherein the sending rate matches the RSSI information and the PER information.

3. The method according to claim 1, further comprising:
   sending, by the wireless communications module, a first control signal to the direct current-direct current converter, wherein the first control signal comprises first power supply information that comprises the supply voltage value for the power amplifier.

4. The method according to claim 3, wherein the sending, by the wireless communications module, the first control signal to the direct current-direct current converter connected to the wireless communications module occurs after the determining, by the wireless communications module, according to the rate grouping class, the supply voltage value.

5. The method according to claim 1, further comprising:
   determining, by the wireless communications module, that the supply voltage value of the power amplifier is 0 V in response to the service data not existing currently.

6. The method according to claim 5, wherein the determining, by the wireless communications module, that the supply voltage value of the power amplifier is 0 V occurs after the identifying, by a wireless communications module comprises in a communications device and when a Wi-Fi mode of the communications device is already enabled, whether service data to be sent exists currently.

7. The method according to claim 5, further comprising:
   sending, by the wireless communications module, a second control signal to a direct current-direct current converter connected to the wireless communications module, wherein the second control signal comprises second power supply information, so that the direct current-direct current converter stops, according to the second power supply information, providing the supply voltage value for the power amplifier.

8. The method for reducing power consumption according to claim 1, further comprising:
   determining, by the wireless communications module, whether the service data is already sent completely.

9. The method according to claim 8, wherein in response to the service data being sent completely, the method further comprises determining, by the wireless communications module, that the supply voltage value of the power amplifier is 0 V.

10. The method according to claim 8, wherein in response to the service data not being sent completely, the method further comprises acquiring, by the wireless communications module, updated received attribute information.

11. The method according to claim 10, wherein in response to the service data not being sent completely, the method further comprises adjusting, by the wireless communications module, the supply voltage value according to the updated received attribute information.

12. An apparatus comprising a computer including a non-transitory computer-readable medium storing program modules executable by the computer, the modules including:
   an identification module configured to identify, when a Wireless Fidelity (Wi-Fi) mode of a communications device is already enabled, whether service data to be sent exists currently;
   an acquiring module configured to acquire received attribute information of the apparatus in response to the service data existing currently; and
   a determining module configured to:
      determine, by using the received attribute information, a sending rate for sending the service data;

acquire, according to the sending rate, a modulation and coding scheme (MCS) index number that corresponds to the sending rate;

acquire, according to the MCS index number, a rate grouping class to which the MCS index number belongs; and determine, according to the rate grouping class, a supply voltage value for a direct current-direct current converter to provide to a power amplifier, wherein the apparatus is connected to the direct current-direct current converter and the power amplifier, wherein the supply voltage value matches the rate grouping class, so that the power amplifier amplifies, according to the supply voltage value, a service request signal carrying the service data.

13. The apparatus according to claim 12, wherein the received attribute information acquired by the acquiring module comprises received signal strength indicator (RSSI) information and packet error rate (PER) information, and wherein the determining module is configured to find, from a stored sending rate table by using the RSSI information and the PER information, a sending rate for sending the service data, wherein the sending rate matches the RSSI information and the PER information.

14. The apparatus according to claim 12, wherein the modules further include:

a sending module configured to send a first control signal to the direct current-direct current converter, wherein the first control signal comprises first power supply information that comprises the supply voltage value for the power amplifier.

15. The apparatus according to claim 14, wherein the determining module is further configured to determine that the supply voltage value of the power amplifier is 0 V in response to the service data not existing currently.

16. The apparatus according to claim 15, wherein the sending module is further configured to send a second control signal to a direct current-direct current converter connected to the apparatus, wherein the second control signal comprises second power supply information, so that the direct current-direct current converter stops, according to the second power supply information, providing the supply voltage value for the power amplifier.

17. The apparatus according to claim 14, wherein modules further include:

a judging module configured to determine whether the service data is already sent completely.

18. The apparatus according to claim 17, wherein in response to the service data being sent completely, the determining module is further configured to determine that the supply voltage value of the power amplifier is 0 V.

19. The apparatus according to claim 17, wherein in response to the service data not being sent completely, the acquiring module is further configured to acquire updated received attribute information.

20. The apparatus according to claim 19, wherein in response to the service data not being sent completely, the determining module is further configured to adjust the supply voltage value according to the updated received attribute information.

* * * * *